No. 686,517. Patented Nov. 12, 1901.
F. R. GILLINDER.
APPARATUS FOR MANUFACTURING ARTICLES OF GLASSWARE.
(Application filed June 20, 1901.)
(No Model.)
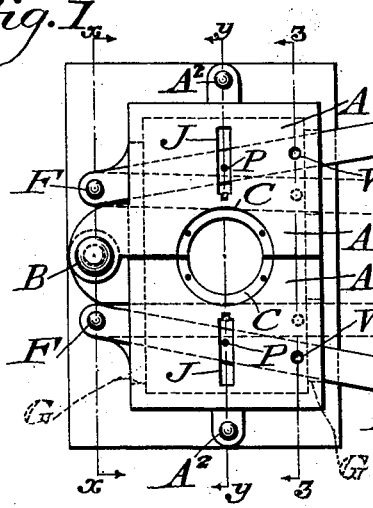
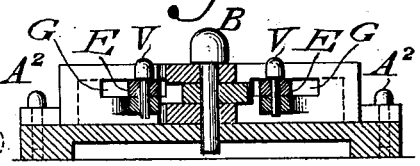
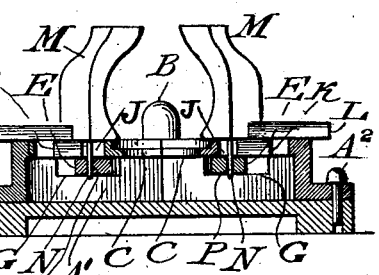
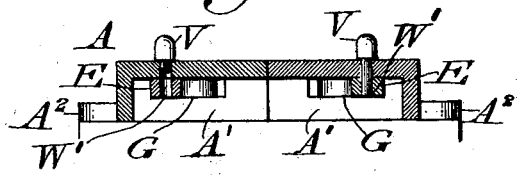
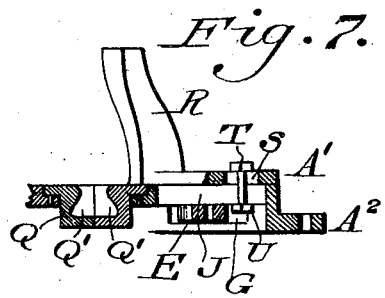
Witnesses
L. Douville
P. H. Eagle
Inventor
Frederick R. Gillinder
By Niederherr & Fairbank
Attorneys
THE NORRIS PETERS CO., PHOTO-LITHO., WASHINGTON, D. C.

UNITED STATES PATENT OFFICE.

FREDERICK R. GILLINDER, OF PHILADELPHIA, PENNSYLVANIA, ASSIGNOR TO GILLINDER & SONS, A CORPORATION OF PENNSYLVANIA.

APPARATUS FOR MANUFACTURING ARTICLES OF GLASSWARE.

SPECIFICATION forming part of Letters Patent No. 686,517, dated November 12, 1901.

Application filed June 20, 1901. Serial No. 65,272. (No model.)

*To all whom it may concern:*

Be it known that I, FREDERICK R. GILLINDER, a citizen of the United States, residing in the city and county of Philadelphia, State of Pennsylvania, have invented a new and useful Improvement in Apparatus for Manufacturing Articles of Glassware, of which the following is a specification.

My invention consists of an apparatus for manufacturing hollow or solid articles of glass, the same embodying a sectional base, adjustable vertical mold members, and interchangeable central mold members, said members being adapted to be seated on said base, the vertical mold members being movable with the sections of said base or movable independently thereof and adjustable, thus avoiding different bases for molds of variable shapes and sizes.

Figure 1 represents a top or plan view of an apparatus for manufacturing articles of glassware embodying my invention, the mold members having been removed therefrom. Fig. 2 represents a vertical section on line $xx$, Fig. 1. Fig. 3 represents a vertical section on line $yy$, Fig. 1. Fig. 4 represents a vertical section on line $zz$, Fig. 1. Fig. 5 represents a plan view of the central mold member. Fig. 6 represents a section thereof on line $aa$. Fig. 7 represents a vertical section of a portion of a modification.

Similar letters of reference indicate corresponding parts in the figures.

Referring to the drawings, A designates the base of the apparatus, the same being formed of sections A' A', which are hinged or pivoted together, as at B, whereby they may be opened and closed. On the inner sides of the sections A' are recesses C, on the walls of which is seated and secured the central section D of a mold, which, as shown in Figs. 5 and 6, consists of a single suitably-shaped piece of metal or material for the article to be molded.

E designates levers, each of which is hinged or pivoted to one of the sections A', as at F, and passed through slots G G in the sections and provided at the end opposite to its axis F with the handle H for operating purposes.

In the upper wall of each section A' is a slot J, which extends in a direction transversely to the lever E, the same receiving the tongue K on the under side of the foot L of the vertical mold-section M, said foot having also depending from it the stud N, which is adapted to enter the opening P in the lever E below the slot J, it being evident that by operating the levers E the mold-sections M may be moved in opposite directions or to or from each other, and accordingly closed and opened.

In this case the base-sections A' A' are bolted or otherwise fastened, as at A², to a table, bed, &c., so as to be immovable thereon.

In molding articles with necks thereon I employ the divided central section Q, (see Fig. 7,) the inner sides of the members thereof being recessed of the contour of said necks, as at Q', the members being respectively attached or secured to the opposite base-sections A'.

The vertical mold-sections R now employed have each a slot S therein for the passage therethrough of the screw or bolt T, which also passes through the slot J in the base-section A' and is engaged by the nut U, whereby said sections R may be adjusted relatively to each other.

Pins, plugs, &c., V are passed through openings W in the base-sections and openings W' in the levers E, thus locking the latter with said base-sections.

In this case the bolts or fastenings A² of the base are removed, whereby the sections A' A' may be separated by means of the levers E, the latter being coupled or locked with said sections, as has been stated, so that each section and the lever thereon move as one, while a member of the divided central section Q follows the motion of the section A', to which it is attached.

It is evident that the central sections D and Q are interchangeable, and different sizes and shapes thereof may be employed.

The vertical mold-sections form a skeleton mold, being employed in lieu of a full mold, it being evident that when said sections are adjusted in the direction to and from each other relatively to the width or diameter of the article to be molded said article as primarily shaped is placed between said sections and blown, after which it is turned within the sections, and so has the proper shape imparted to the article without the necessity of a full mold.

Having thus described my invention, what I claim as new, and desire to secure by Letters Patent, is—

1. In an apparatus of the character stated, a base formed of opening sections, means for supporting a central mold-section thereon, and upright mold members adjustably mounted on said base-sections.

2. In an apparatus of the character stated, a base formed of sections adapted to be opened and closed, and mold-sections mounted on said base-sections and adapted to be moved with the latter or independently thereof.

3. In an apparatus of the character stated, a base formed of opening and closing sections, levers mounted on said sections, and mold-sections connected with said levers, whereby said mold-sections are adjustable on said base-sections.

4. In an apparatus of the character stated, a base formed of opening and closing sections, levers mounted on said sections and independently movable thereon, mold-sections connected with said levers and means for locking said levers with said base-sections, whereby said levers are rendered immovable on said base-sections.

5. In an apparatus of the character stated, a base formed of opening and closing sections, mold-sections mounted on said base-sections, levers having their bearings on said base-sections, and means whereby said levers are adapted to operate said mold-sections independently of said base-sections or conjointly therewith.

6. In an apparatus for molding articles of glass, vertical mold members of skeleton form, a base composed of separable sections adapted to support said members respectively, and means for operating said members independently of the base-sections or conjointly therewith.

FREDK. R. GILLINDER.

Witnesses:
JOHN A. WIEDERSHEIM,
C. D. McVAY.